US009206925B2

(12) United States Patent
Rouleau et al.

(10) Patent No.: US 9,206,925 B2
(45) Date of Patent: Dec. 8, 2015

(54) GANGABLE CONDUIT HANGER ASSEMBLY

(71) Applicant: Panduit Corp., Tinley Park, IL (US)

(72) Inventors: Rodney Rouleau, Manhattan, IL (US); James Banaszak, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/200,304

(22) Filed: Mar. 7, 2014

(65) Prior Publication Data

US 2014/0263871 A1    Sep. 18, 2014

Related U.S. Application Data

(60) Provisional application No. 61/782,950, filed on Mar. 14, 2013.

(51) Int. Cl.
| | | |
|---|---|---|
| *F16L 3/22* | (2006.01) | |
| *F16L 3/00* | (2006.01) | |
| *F16L 3/123* | (2006.01) | |
| *F16L 3/24* | (2006.01) | |
| *F16B 2/24* | (2006.01) | |

(52) U.S. Cl.
CPC . *F16L 3/00* (2013.01); *F16L 3/123* (2013.01); *F16L 3/222* (2013.01); *F16L 3/24* (2013.01); *F16B 2/245* (2013.01)

(58) Field of Classification Search
CPC ............ F16B 2/245; F16L 3/00; F16L 3/123; F16L 3/222; F16L 3/24
USPC ..................................... 248/59, 63, 74.2, 68.1
See application file for complete search history.

(56) References Cited

U.S. PATENT DOCUMENTS

| | | | |
|---|---|---|---|
| 1,472,955 A | 11/1923 | Behringer | |
| 2,338,660 A * | 1/1944 | Morehouse | ................. 248/68.1 |
| 2,928,637 A * | 3/1960 | Jansson | ........................ 248/68.1 |
| 3,532,311 A | 10/1970 | Havener | |
| 4,813,639 A | 3/1989 | Midkiff et al. | |
| 5,971,329 A | 10/1999 | Hickey | |
| 6,161,804 A | 12/2000 | Paske et al. | |
| 6,354,543 B1 | 3/2002 | Paske | |
| 6,857,606 B1 | 2/2005 | Gretz | |
| 6,899,305 B2 | 5/2005 | Korczak et al. | |
| 7,021,591 B1 | 4/2006 | Gretz | |
| 7,097,142 B1 | 8/2006 | Schmidt | |
| 7,175,138 B2 | 2/2007 | Low et al. | |
| 7,293,745 B2 | 11/2007 | Catapano | |
| 7,407,138 B1 | 8/2008 | Gretz | |
| 7,484,698 B2 | 2/2009 | Budagher | |

(Continued)

FOREIGN PATENT DOCUMENTS

| | | | |
|---|---|---|---|
| DE | 8802440 U1 | 4/1988 | |
| FR | 1377579 A | 11/1964 | |
| GB | 885372 A | 12/1961 | |

*Primary Examiner* — Gwendolyn W Baxter
(74) *Attorney, Agent, or Firm* — Christopher S. Clancy; Aimee E. McVady (57) ABSTRACT

A conduit hanger assembly that supports at least one conduit is disclosed. The conduit hanger assembly includes a first member and a second member extending from the first member. The first member has a U-shaped clamp that engages a building structure to support the hanger assembly. The second member has a base with arms extending therefrom. The U-shaped clamp, base and arms define a channel to support the conduit therein. The conduit hanger assembly may include gangable add-on conduit hangers that connect to the conduit hanger assembly to support additional conduits in the assembly.

10 Claims, 12 Drawing Sheets

(56) References Cited

U.S. PATENT DOCUMENTS

| | | |
|---|---|---|
| 7,520,476 B2 * | 4/2009 | Caveney et al. ............... 248/72 |
| 8,011,621 B2 | 9/2011 | Korczak |
| 8,191,836 B2 | 6/2012 | Korczak |
| 8,356,778 B2 * | 1/2013 | Birli et al. ................. 248/73 |
| 2004/0056156 A1 * | 3/2004 | Dodson ........................ 248/59 |
| 2008/0093510 A1 * | 4/2008 | Oh et al. ..................... 248/63 |
| 2009/0230256 A1 | 9/2009 | Widlacki et al. |
| 2013/0320157 A1 * | 12/2013 | Carter et al. ................. 248/68.1 |

\* cited by examiner

FIG.12 ns of conduits. The

GANGABLE CONDUIT HANGER ASSEMBLY

CROSS-REFERENCE TO RELATED APPLICATIONS

This application claims priority to U.S. Provisional Application No. 61/782,950, filed Mar. 14, 2013, the subject matter of which is hereby incorporated by reference in its entirety.

BACKGROUND OF THE INVENTION

The present invention relates to a hanger for supporting conduits, and more particularly, to a gangable conduit hanger assembly for supporting multiple conduits.

SUMMARY OF THE INVENTION

The present invention is directed toward a conduit hanger assembly designed to support at least one conduit. The conduit hanger assembly includes a first member and a second member extending from the first member. The first member includes a U-shaped clamp designed to engage a building structure. The second member having a base with arms extending therefrom. The U-shaped clamp, base and arms define a channel to support a conduit. The conduit hanger assembly may also include a gangable add-on conduit hanger. The add-on conduit hanger connects to the second member of the conduit hanger assembly to support additional conduits in the assembly.

DETAILED DESCRIPTION

Figure 3:
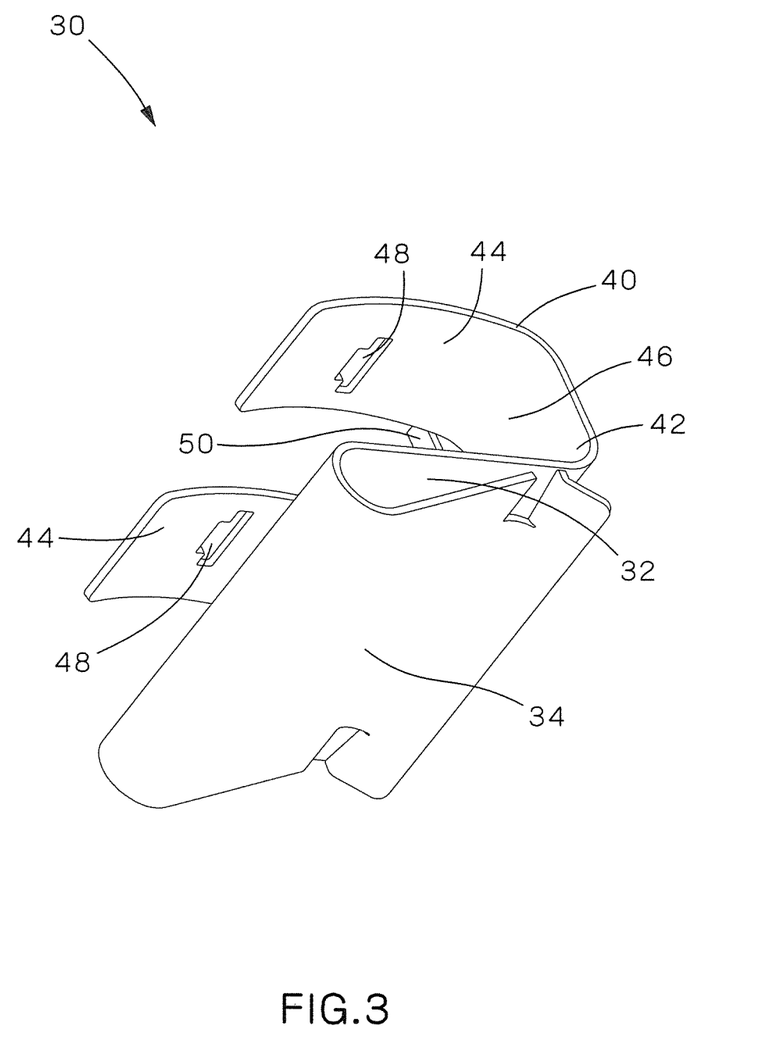
FIG. 3 is right top perspective view of the gangable conduit hanger of FIG. 1.
Figure 4:
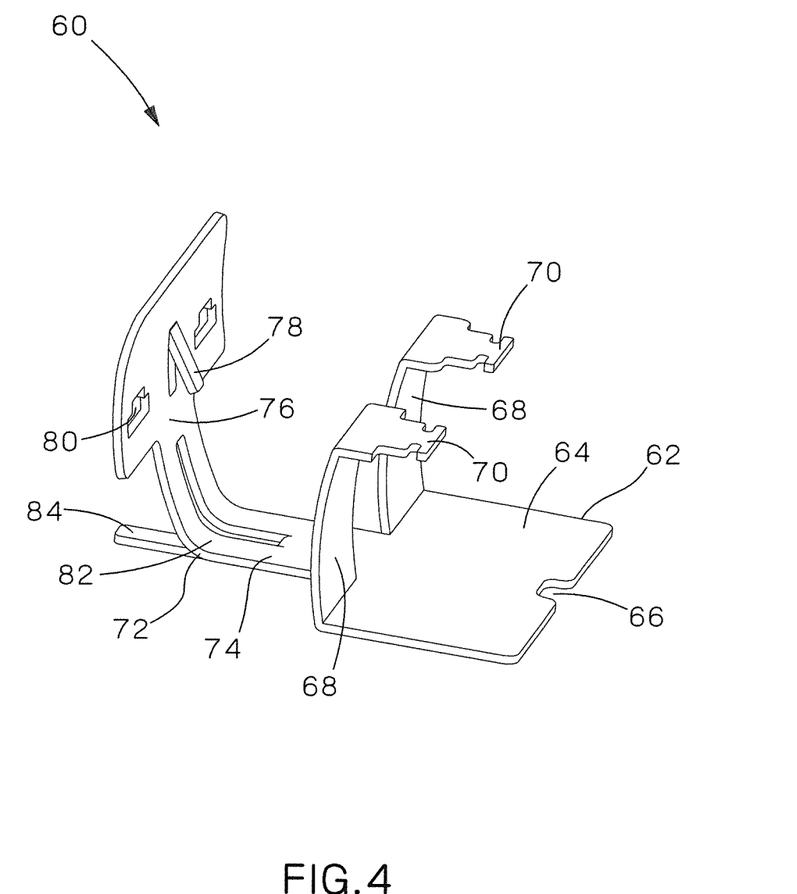
FIG. 4 is a perspective view of an add-on conduit hanger of the present invention.
Figure 5:
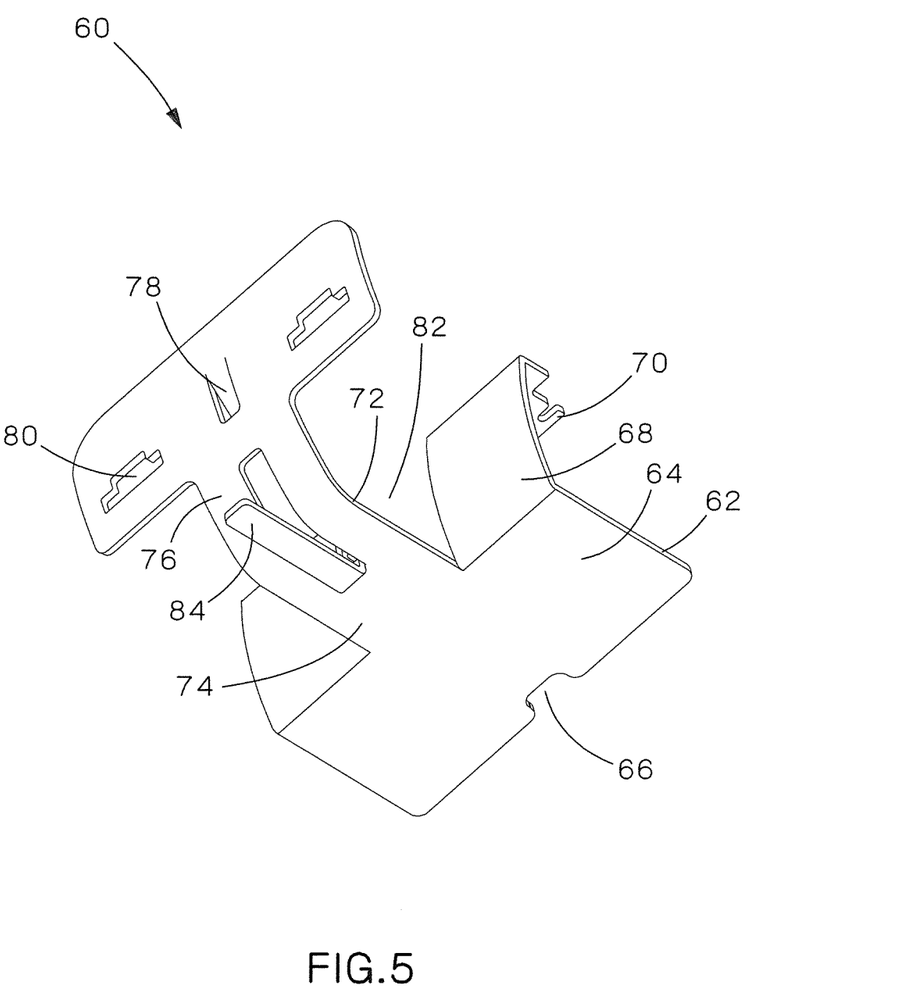
FIG. 5 is a rear left perspective view of the add-on conduit hanger of FIG. 4.
Figure 6:
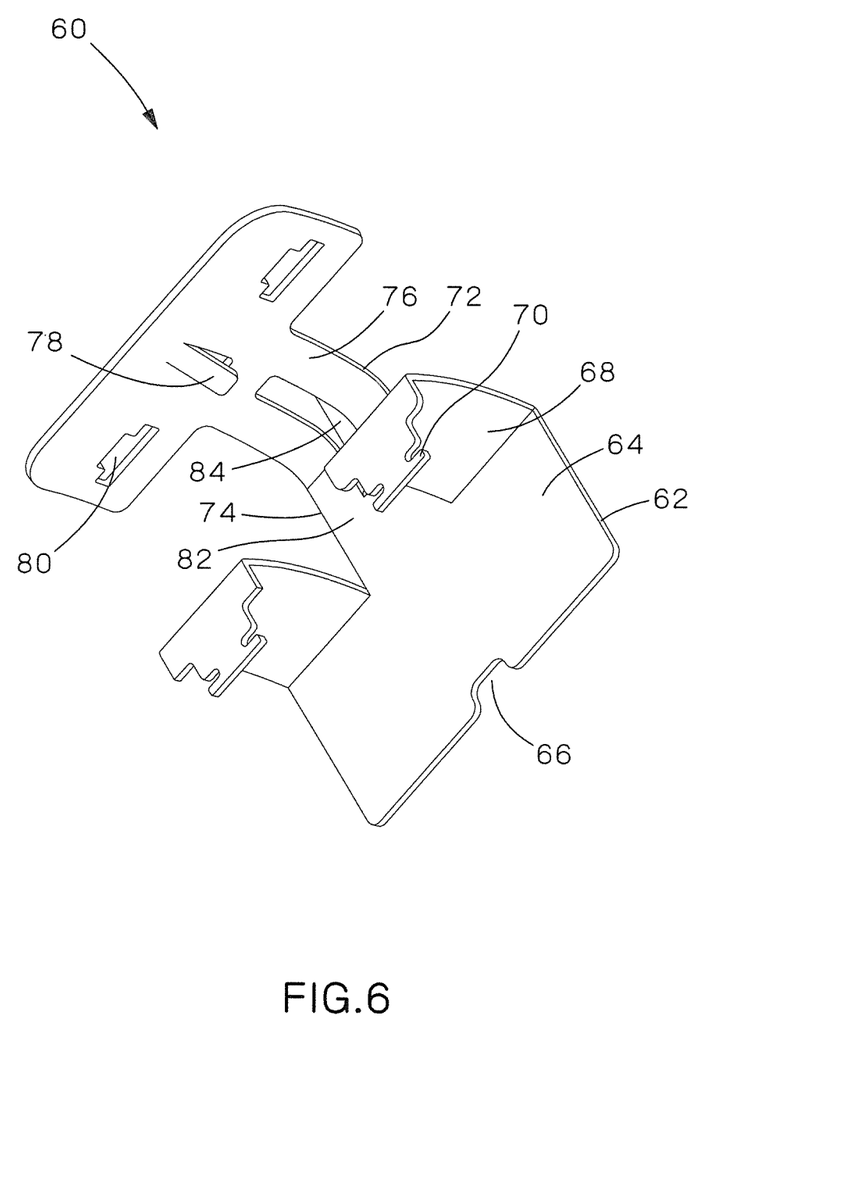
FIG. 6 is a top right perspective view of the add-on conduit hanger of FIG. 4.

The gangable conduit hanger assembly 20 of the present invention includes a gangable conduit hanger 30 (see FIGS. 1-3) and add-on conduit hangers 60 (see FIGS. 4-6). The gangable conduit hanger 30 can also be used as a stand alone hanger to support a conduit, if desired.

Figure 1:
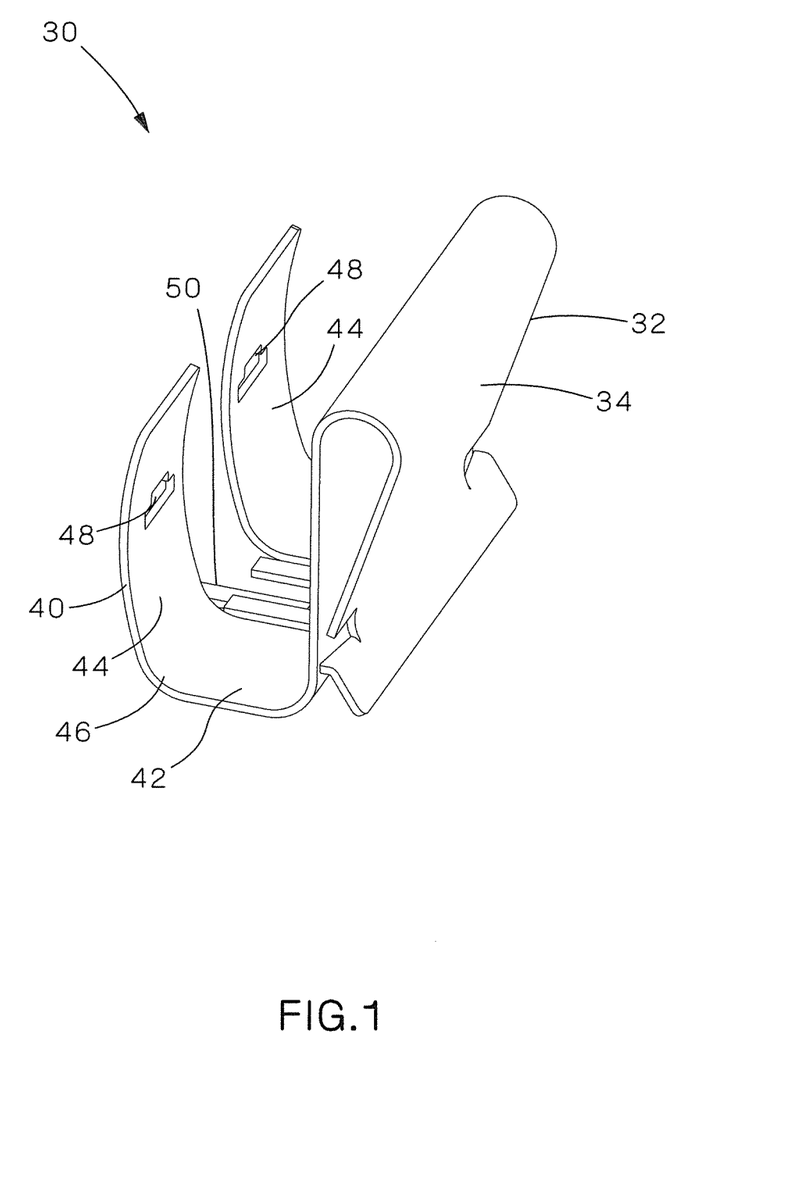
FIG. 1 is a perspective view of the gangable conduit hanger of the present invention.
Figure 2:
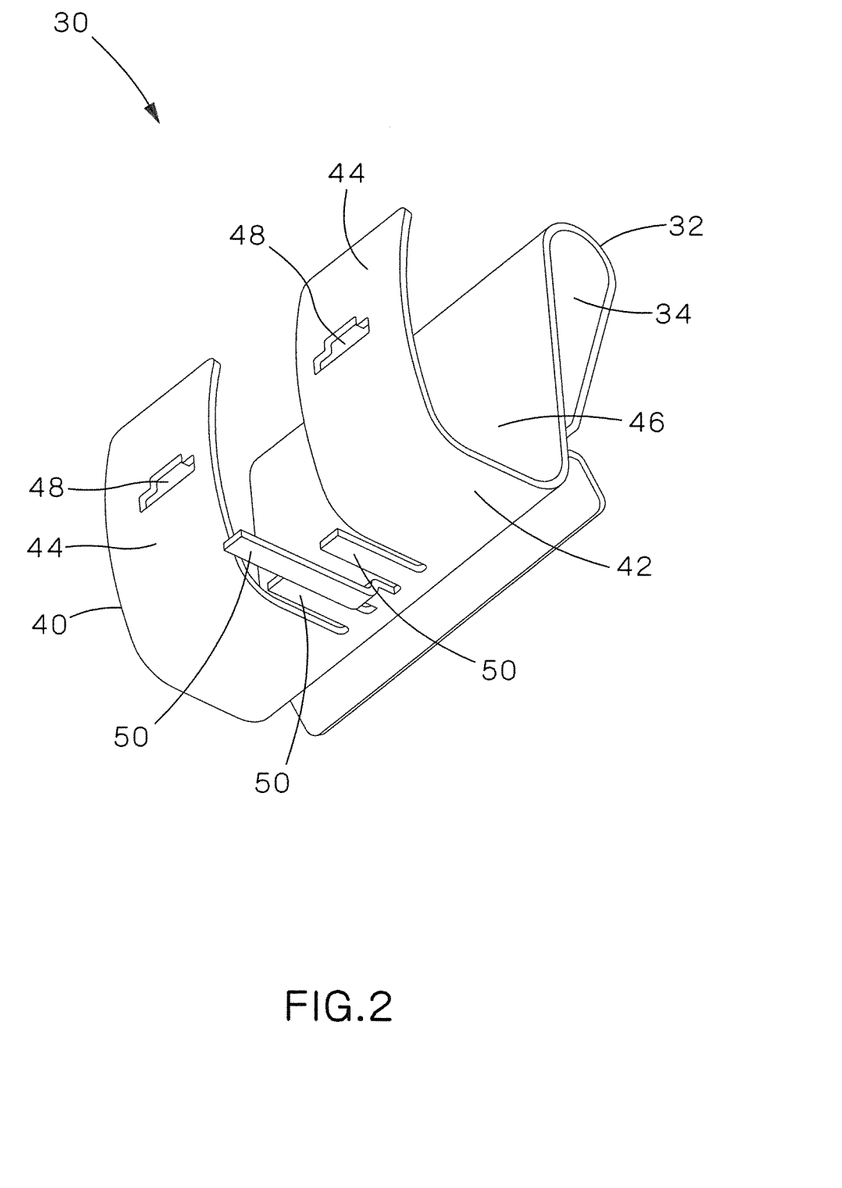
FIG. 2 is a left rear perspective view of the gangable conduit hanger of FIG. 1.

FIGS. 1-3 illustrate the gangable conduit hanger 30. The gangable conduit hanger 30 includes a first member 32 and a second member 40. The first member 32 includes a U-shaped clamp 34 for engaging a purlin 100, or other building structure, (see FIG. 7). The first member 32 also includes a conduit retaining tab 36 that extends from the U-shaped clamp 34 (see FIG. 7).

The second member 40 of the gangable conduit hanger 30 extends from the first member 32. The second member 40 includes a base 42 and two arms 44 that define a channel 46 for supporting a conduit 110 (see FIG. 12). Each arm 44 includes a locking key hole 48 for receiving a locking key 70 (see FIGS. 8A & 8B). Support arms 50 extend from the base 42 and are located between the arms 44 of the second member 40.

FIGS. 4-6 illustrate an add-on conduit hanger 60. The add-on conduit hanger 60 includes a first member 62 and a second member 72. The first member 62 includes a main member 64 with a notch 66 located at the center of the distal edge of the first member 62. The first member 62 also includes arms 68 extending from the main member 64. Each arm 68 includes a locking key 70 for engaging the locking key holes 48 of an adjacent gangable conduit hanger 30 or the locking key holes 80 of an adjacent add-on conduit hanger 60 (see FIGS. 8A-12).

The second member 72 of the add-on conduit hanger 60 extends from the first member 62. The second member 72 includes a base 74 and an arm 76 that define a channel 82 for supporting a conduit 110 (see FIG. 12). The arm 76 includes a conduit retaining tab 78 located at the center of the arm 76. The arm 76 also includes key holes 80 that are positioned on either side of the retaining tab 78. A support arm 84 extends from the base 74 to engage an adjacent add-on conduit hanger 60 (see FIG. 11).

Figure 7:
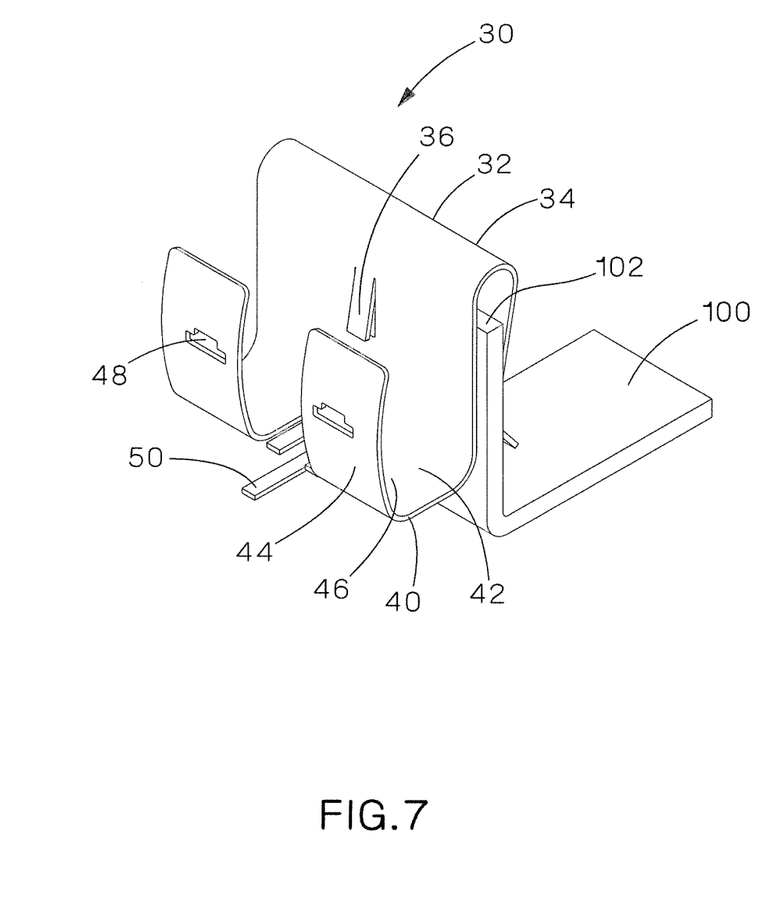
FIG. 7 is a perspective view of the gangable conduit hanger of FIG. 1 attached to a purlin.

FIG. 7 illustrates the gangable conduit hanger 30 installed on a purlin 100. The U-shaped clamp 34 of the first member 32 is positioned over the edge 102 of a purlin 100. If desired, a conduit 110 may be positioned in the channel 46 defined by the second member 40 without securing additional hangers.

Figures 8A, 8B:
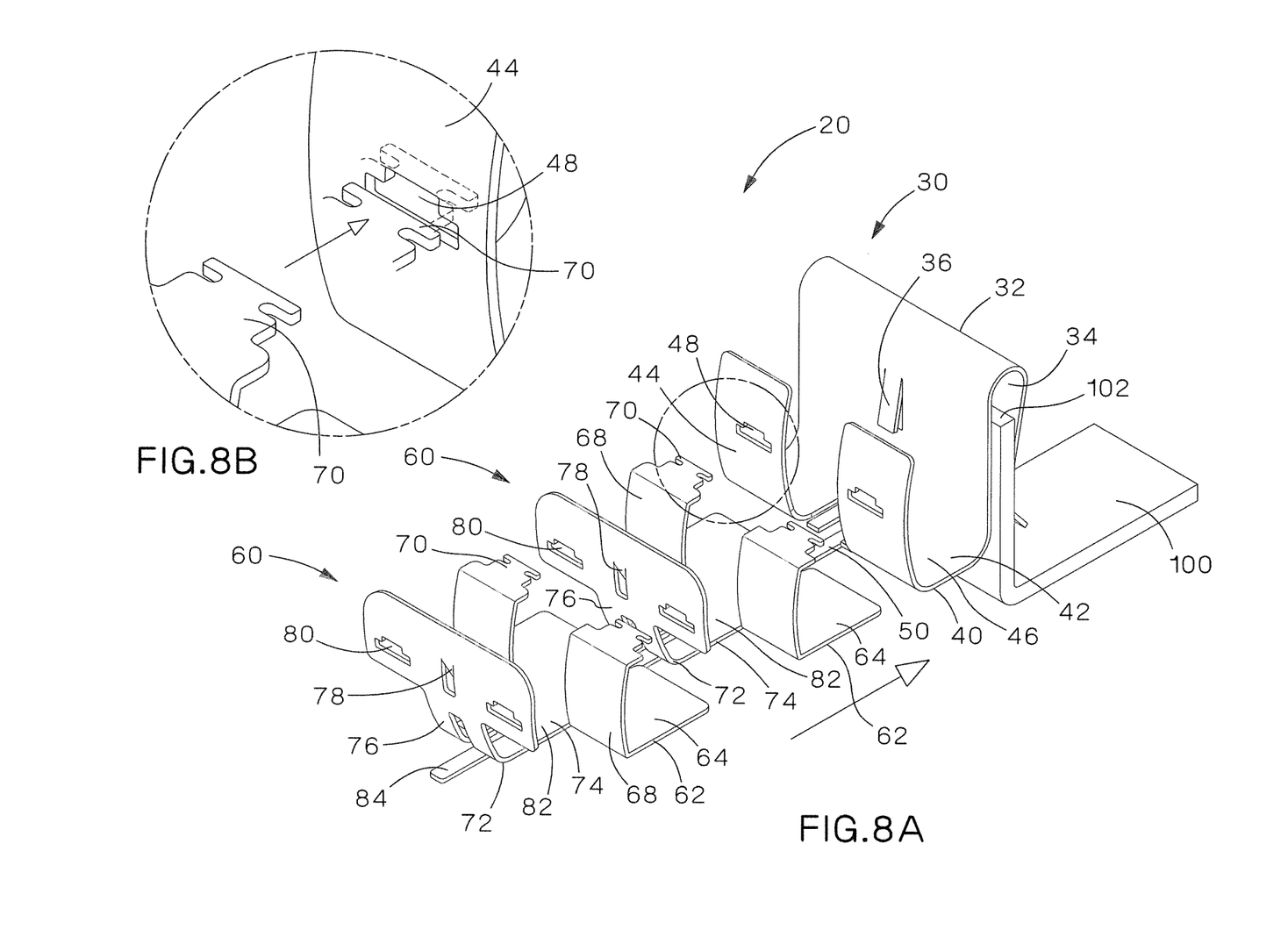
FIG. 8A is a perspective view of the gangable conduit hanger of FIG. 7 and add-on conduit hangers positioned to be secured to the gangable conduit hanger.
FIG. 8B is a detailed view of the locking key of the add-on conduit hanger and the locking key hole of the gangable conduit hanger of FIG. 8A.
Figure 9:
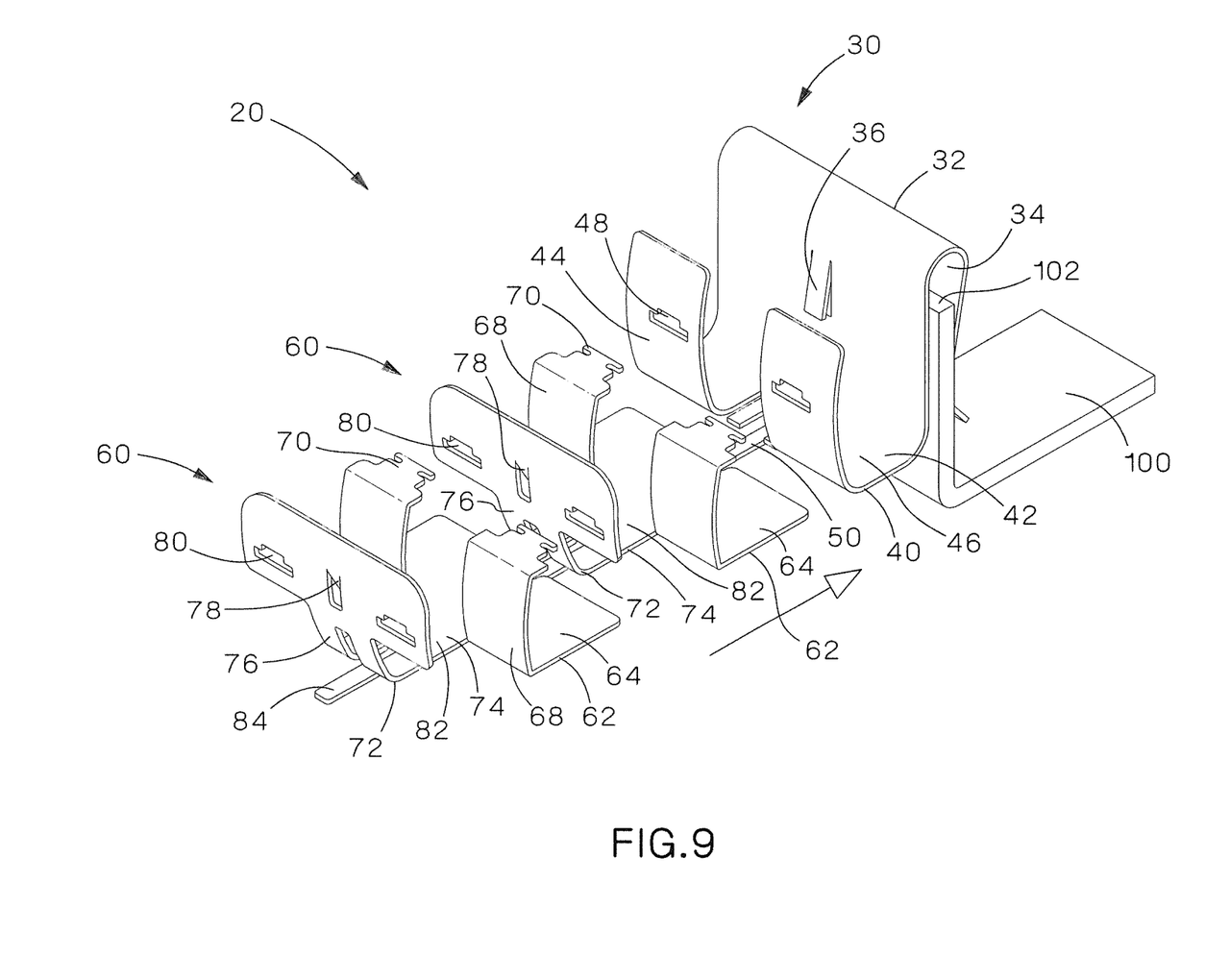
FIG. 9 is a perspective view of the gangable conduit hanger of FIG. 7 and add-on conduit hangers positioned to be secured to the gangable conduit hanger.
Figure 10:
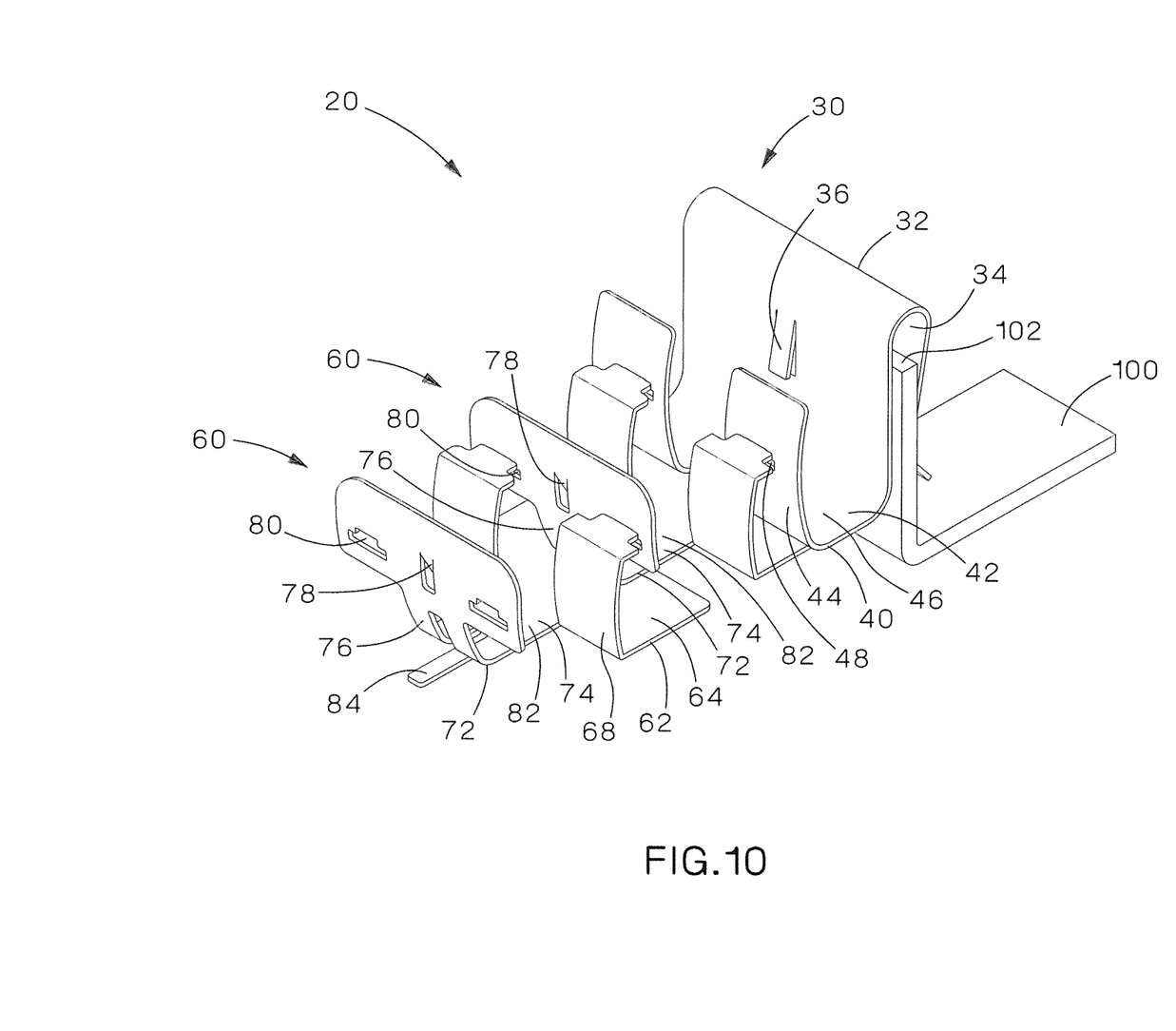
FIG. 10 is a top perspective view of add-on conduit hangers secured to the gangable conduit hanger of FIG. 9.
Figure 11:
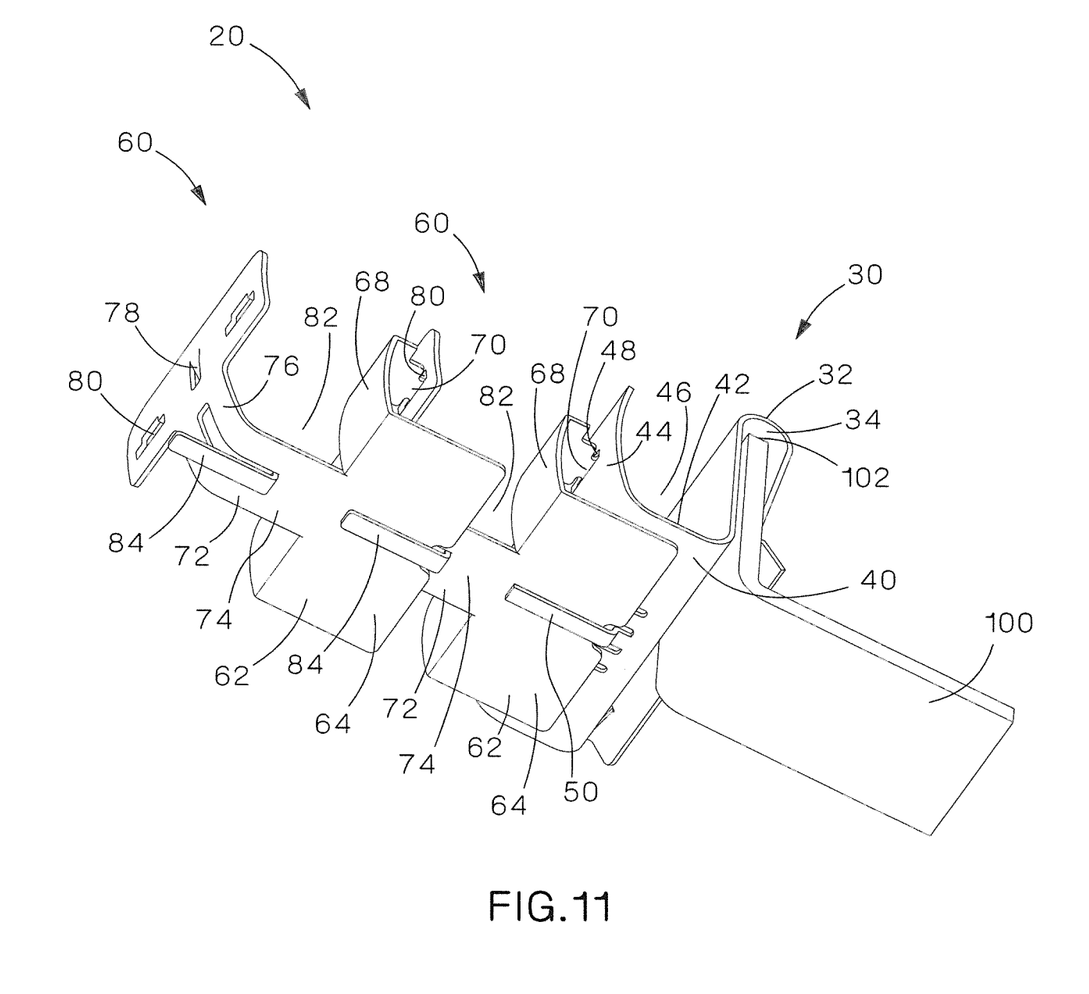
FIG. 11 is a bottom perspective view of add-on conduit hangers secured to the gangable conduit clamp of FIG. 9.

As illustrated in FIGS. 8A and 8B, an add-on conduit hanger 60 is lined up with the gangable conduit hanger 30. The locking keys 70 of the add-on conduit hanger 60 are positioned to be slid into the locking key holes 48 of the gangable conduit hanger 30. After the locking keys 70 are slid into the locking key holes 48, the locking keys 70 are raised to secure the add-on conduit hanger 60 to the gangable conduit hanger 30.

As illustrated in FIGS. 8A and 9-11, additional add-on conduit hangers 60 may be added to the gangable conduit hanger assembly 20. A second add-on conduit hanger 60 is aligned with a first add-on conduit hanger 60 such that the locking keys 70 are positioned to slide into the locking key holes 80 in the arm 76 of the second member 72 of the add-on conduit hanger 60. The support arms 84 extending from the base 74 of the add-on conduit hangers 60 guide a new add-on conduit hanger 60 into position.

Figure 12:
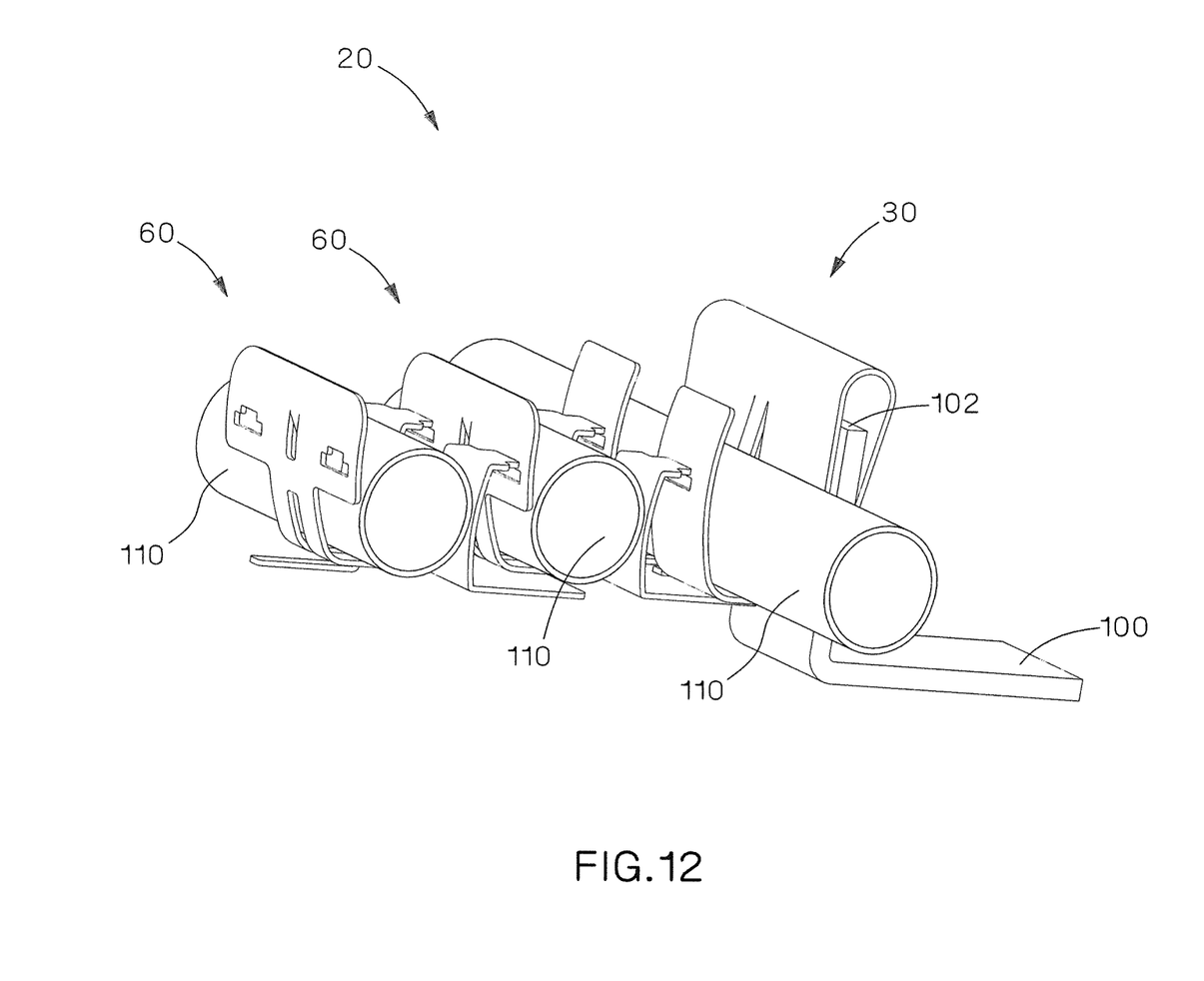
FIG. 12 is a perspective view of the assembled gangable conduit hanger assembly of FIG. 10 with conduits installed therein.

As illustrated in FIG. 12, once the desired number of conduit hangers is in place, conduits 110 are positioned in the channels 46, 82 of the gangable conduit hanger 30 and the add-on conduit hangers 60, respectively. The conduits 110 are held in place by the conduit retaining tabs 36, 78.

The gangable conduit hanger assembly of the present invention is a versatile device that can be used as a single hanger or as multiple hangers for a number of conduits. The common mating features of the conduit hanger assembly enable different sized conduit hangers to attach to each other. As such, multiple conduits can be routed without the use of a costly structural channel system.

The add-on conduit hangers do not require a tool for installation. The add-on conduit hangers are light weight thereby limiting the amount of weight supported by the building structures. The gangable conduit hangers and the add-on conduit hangers may also be reused or reconfigured multiple times as necessary.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A conduit hanger assembly for supporting a conduit, the conduit hanger assembly comprising:
    a first member having a U-shaped clamp for receiving a building structure to support the conduit hanger assembly;
    a second member extending from the first member, wherein the second member having a base and arms extending outwardly and upwardly from the base, wherein the U-shaped clamp, the base and the arms define a channel for supporting the conduit therein; and
    at least one add-on conduit hanger for supporting additional conduits in the conduit hanger assembly, wherein the add-on conduit hanger engages the arms and the base of the second member of the conduit hanger assembly.

2. The conduit hanger assembly of claim 1, wherein the add-on conduit hanger comprising an add-on first member having a main member and L-shaped arms extending upwardly therefrom and an add-on second member.

3. The conduit hanger assembly of claim 2, wherein the L-shaped arms of the add-on first member of the add-on conduit hanger having a locking key at a distal end.

4. The conduit hanger assembly of claim 2, wherein the add-on second member of the add-on conduit hanger having a base and a T-shaped arm extending upwardly from the base, wherein the base, the L-shaped arms of the add-on first member and the T-shaped arm of the add-on second member define a channel in the add-on conduit hanger for receiving the conduit therein.

5. The conduit hanger assembly of claim 4, wherein the T-shaped arm of the add-on second member further comprising a conduit retaining tab extending downward from the T-shaped arm into the channel.

6. The conduit hanger assembly of claim 4, wherein the T-shaped arm of the add-on second member further comprising locking key holes for receiving a locking key of an adjacent add-on conduit hanger.

7. The conduit hanger assembly of claim 2, wherein the add-on second member of the add-on conduit hanger further comprising a support arm for engaging a main member of an adjacent add-on conduit hanger.

8. The conduit hanger assembly of claim 7, wherein the main member of the adjacent add-on conduit hanger having a notch positioned along an edge at the center of the main member, the notch for positioning a support arm of the adjacent add-on conduit hanger.

9. The conduit hanger assembly of claim 1, wherein the U-shaped clamp further including a conduit retaining tab extending from the U-shaped clamp into the channel for securing the conduit positioned within the channel.

10. The conduit hanger assembly of claim 1, wherein the arms of the second member of the conduit hanger assembly comprising a locking key hole.

* * * * *